US010970899B2

(12) United States Patent
Rakshit et al.

(10) Patent No.: US 10,970,899 B2
(45) Date of Patent: Apr. 6, 2021

(54) AUGMENTED REALITY DISPLAY FOR A VEHICLE

(71) Applicant: International Business Machines Corporation, Armonk, NY (US)

(72) Inventors: Sarbajit K. Rakshit, Kolkata (IN); Gregory J. Boss, Saginaw, MI (US); John E. Moore, Jr., Pflugerville, TX (US); Brent Hodges, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/168,103

(22) Filed: Oct. 23, 2018

(65) Prior Publication Data

US 2020/0126276 A1  Apr. 23, 2020

(51) Int. Cl.
*G06T 11/60* (2006.01)
*B60Q 9/00* (2006.01)
*G06F 3/16* (2006.01)
*G10L 25/51* (2013.01)
*G10L 25/84* (2013.01)
*G10L 15/26* (2006.01)

(52) U.S. Cl.
CPC ............... *G06T 11/60* (2013.01); *B60Q 9/00* (2013.01); *G06F 3/165* (2013.01); *G10L 15/26* (2013.01); *G10L 25/51* (2013.01); *G10L 25/84* (2013.01)

(58) Field of Classification Search
CPC ........... G06T 11/60; B60Q 9/00; G06F 3/165; G10L 25/51; G10L 25/84; G10L 15/265
See application file for complete search history.

(56) References Cited

U.S. PATENT DOCUMENTS

| 3,626,365 | A | 12/1971 | Press et al. |
| 6,087,961 | A | 7/2000 | Markow |
| 6,404,351 | B1 | 6/2002 | Beinke |
| 10,284,317 | B1* | 5/2019 | Sanchez ............... H04H 20/62 |
| 2002/0102961 | A1 | 8/2002 | Gibbons et al. |
| 2003/0201906 | A1 | 10/2003 | Buscemi |
| 2012/0313792 | A1 | 12/2012 | Behm et al. |
| 2014/0019005 | A1* | 1/2014 | Lee .................... G08G 1/0962 701/36 |
| 2015/0116133 | A1 | 4/2015 | Mawbey et al. |
| 2016/0016513 | A1* | 1/2016 | Di Censo ............. H03G 3/32 340/467 |

(Continued)

FOREIGN PATENT DOCUMENTS

WO   WO1999031637 A1   6/1999

*Primary Examiner* — Yu Chen
(74) *Attorney, Agent, or Firm* — Yee & Associates. P.C.

(57) ABSTRACT

A method, apparatus, system, and computer program product for providing an in-vehicle display of information for an object of interest. Sound data is received from a sound sensor system connected to the vehicle. The sound data is for sounds detected in an exterior environment around the vehicle. The sound data is analyzed for a presence of an object of interest. The location of the object of interest is determined using the sound data in response to detecting the presence of the object of interest. A visual indicator for the object of interest is displayed using an electronic display system in the vehicle to augment a live view of the exterior environment seen through a window of the vehicle for the in-vehicle display of the information for the object of interest to draw attention to the object of interest in the live view.

17 Claims, 11 Drawing Sheets

(56) References Cited

U.S. PATENT DOCUMENTS

| | | | |
|---|---|---|---|
| 2016/0286026 A1* | 9/2016 | Lord | G08G 1/096741 |
| 2017/0213459 A1* | 7/2017 | Ogaz | G08G 1/166 |
| 2017/0263266 A1* | 9/2017 | Henrique Barbosa Postal | H04R 29/00 |
| 2018/0003965 A1* | 1/2018 | O'Toole | G02B 27/0101 |
| 2018/0053413 A1* | 2/2018 | Patil | G01S 11/14 |
| 2018/0077506 A1* | 3/2018 | Wacquant | H04R 3/005 |
| 2018/0165964 A1* | 6/2018 | Jang | G01S 3/8083 |
| 2018/0357431 A1* | 12/2018 | Ellingson | H04L 63/08 |
| 2019/0023282 A1* | 1/2019 | Kuroda | H04S 1/00 |
| 2019/0049989 A1* | 2/2019 | Akotkar | G05D 1/0255 |
| 2019/0220248 A1* | 7/2019 | Cordourier Maruri | G05D 1/0255 |

* cited by examiner

AUGMENTED REALITY DISPLAY FOR A VEHICLE

BACKGROUND

1. Field

The disclosure relates generally to an improved computer system and more specifically to method, apparatus, system, and computer program product for an in-vehicle display of information for an object of interest.

2. Description of the Related Art

When operating a vehicle, such as an automobile, it is important to have situational awareness of the environment around the automobile. One source of information for situational awareness is the view of the environment that the driver sees from looking through windows in the automobile. For example, the driver may look through the windshield or side windows to see the road, other vehicles, and other objects. Another source of information for situational awareness is the sounds in the environment around the automobile.

For example, a driver may see flashing lights and hear a siren from an emergency response vehicle in the distance that is approaching the automobile. This combination of information enables the driver to slow down, pull over, or perform some other operation in response to detecting the presence of the emergency response vehicle.

Depending on the environmental conditions, the driver may not see the flashing lights because of obstructions, such as a wall or shrubs near an intersection. Further, the driver also may be unable to hear the siren. In some cases, more resources, such as a radio in the vehicle may be loud enough that sounds from outside of the automobile cannot be heard.

SUMMARY

According to one embodiment of the present invention, a method provides for an in-vehicle display of information for an object of interest. Sound data is received by a computer system from a sound sensor system connected to the vehicle. The sound data is for sounds detected in an exterior environment around the vehicle. The sound data is analyzed by the computer system for a presence of an object of interest. The location of the object of interest with respect to the vehicle is determined by the computer system using the sound data in response to detecting the presence of the object of interest. A visual indicator for the object of interest with an indication of the location of the object of interest is displayed by the computer system using an electronic display system in the vehicle to augment a live view of the exterior environment seen through a window of the vehicle for the in-vehicle display of the information for the object of interest to draw attention to the object of interest in the live view.

According to another embodiment of the present invention, a vehicle information visualization system comprises a computer system that receives sound data from a sound sensor system connected to the vehicle. The sound data is for sounds detected in an exterior environment around the vehicle. The computer system analyzes the sound data for a presence of an object of interest. The computer system determines a location of the object of interest with respect to the vehicle using the sound data in response to detecting the presence of the object of interest. The computer system displays a visual indicator for the object of interest with an indication of the location of the object of interest using an electronic display system in the vehicle to augment a live view of the exterior environment seen through a window of the vehicle to draw attention to the object of interest in the live view.

According to yet another embodiment of the present invention, a computer program product for an in-vehicle display of information for an object of interest comprises a computer-readable-storage media, first program code, second program code, third program code, and fourth program code stored on the computer-readable storage media. The first program code is run to receive sound data from a sound sensor system connected to the vehicle. The sound data is for sounds detected in an exterior environment around the vehicle. The second program code is run to analyze the sound data for a presence of an object of interest. The third program code is run to determine a location of the object of interest with respect to the vehicle using the sound data in response to detecting the presence of the object of interest. The fourth program code is run to display a visual indicator for the object of interest with an indication of the location of the object of interest using an electronic display system in the vehicle to augment a live view of the exterior environment seen through a window of the vehicle to draw attention to the object of interest in the live view.

DETAILED DESCRIPTION

Figure 1:
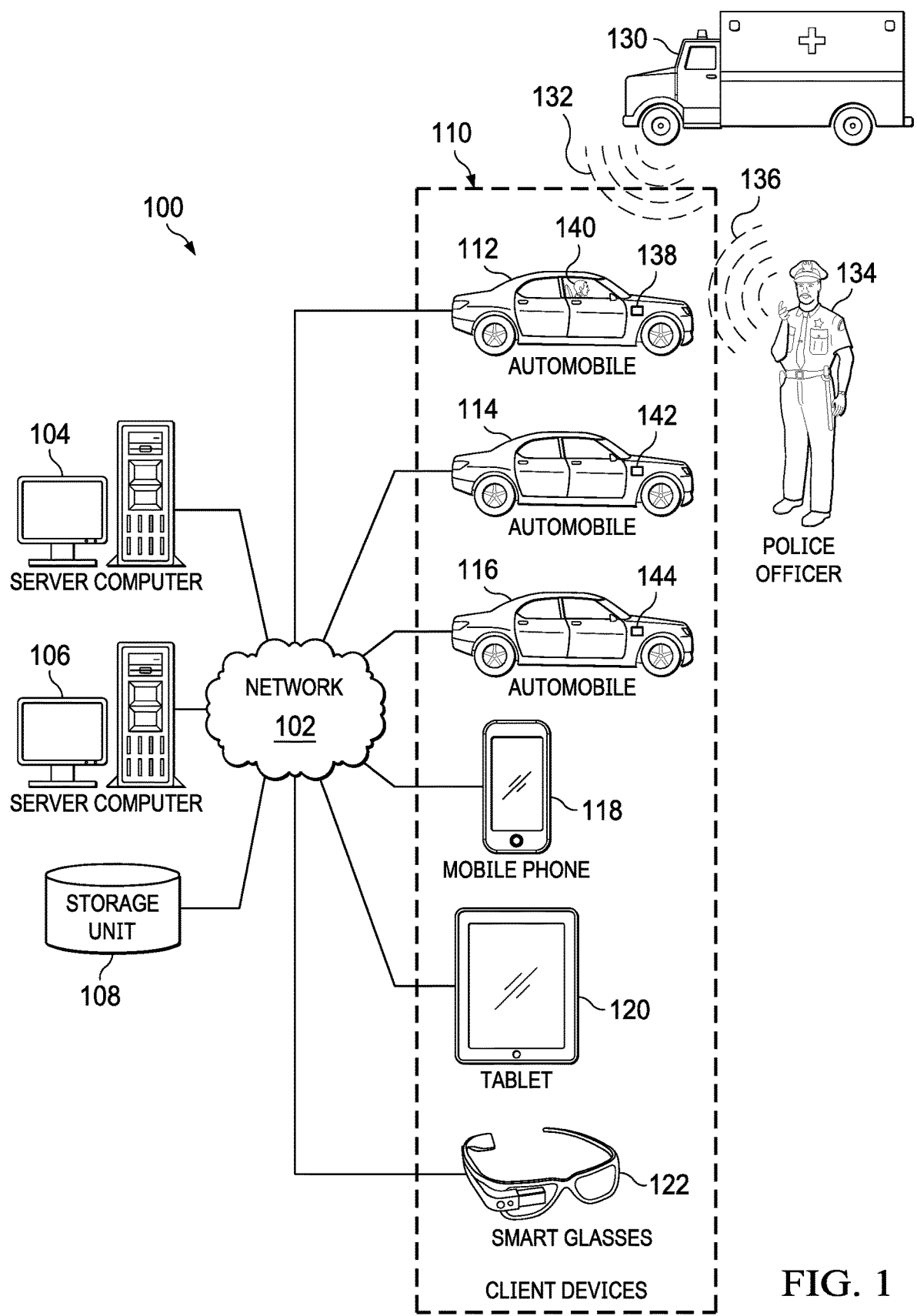
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize that it would be desirable to have a method and apparatus that take into account at least some of the issues discussed above, as well as other possible issues. For example, it would be desirable to have a method and apparatus that overcome a technical problem with the occupants of the vehicle being unable to hear sounds in an exterior environment around vehicle for an object of interest, such as an emergency response vehicle.

The illustrative embodiments recognize and take into account that various conditions can make detecting and interpreting sounds from the exterior the vehicle more difficult than desired. For example, the illustrative embodiments recognize and take into account that at least one of interior sounds, hearing capabilities of occupants, or other factors can make detecting sounds from emergency response vehicles more difficult than desired. Further, the illustrative embodiments also recognize and take into account that hearing other sounds such as a police officer providing instructions, car horns, or other types sounds may be more difficult than desired.

Thus, illustrative embodiments provide a method, apparatus, system, and computer program product for an in-vehicle display of information for an object of interest. In one illustrative example, sound data is received from a sound sensor system connected to the vehicle. The sound data is for sounds detected in an exterior environment around the vehicle. The sound data is analyzed for a presence of an object of interest. A location of the object of interest with respect to the vehicle is determined using the sound data in response to detecting the presence of the object of interest. A visual indicator for the object of interest with an indication of the location of the object of interest is displayed using an electronic display system in the vehicle to augment a live view of the environment seen through a window of the vehicle for the in-vehicle display of the information for the object of interest to draw attention to the object of interest in the live view.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include vehicles such as automobile 112, automobile 114, and automobile 116. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IOT) in which these physical devices can connect to network 102 and exchange information with each other over network 102.

Client devices 110 are clients to server computer 104 in this example. Network data processing system 100 may include additional server computers, client computers, and other devices not shown. In this illustrative example, client devices 110 connect to network 102 utilizing wireless connections. These wireless connections may include at least one of a wi-fi connection, a mobile broadband connection, a personal area network (PAN) connection as a Bluetooth connection, a cellular network connection, or other suitable connections that can be implemented in client devices 110.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, automobile 112 includes microphones that enable detecting sounds from an exterior environment around automobile 112. These microphones generate sound data that is analyzed for presence of an object of interest. In this illustrative example, ambulance 130 generates sound 132 from a siren on ambulance 130. Sound 132 is detected by microphones on automobile 112. As another example, police officer 134 generates sound 136 that is detected by microphones on automobile 112. Sound 136 from police officer 134 can be instructions such as directing traffic for ambulance 130.

These sounds and other sounds are detected by the microphones which generate sound data analyzed by automotive computer system 138 in automobile 112. Automotive computer system 138 is comprised of at least one of an electronic control unit, a computer, a processor unit, or other electronic devices capable of processing data in automobile 112.

Automotive computer system 138 analyzes the sound data for a presence of an object of interest. In this depicted example, two objects of interest are present, ambulance 130 and police officer 134. Additionally, when an object of interest is detected, the location of the object of interest is determined. The location can be determined using currently available sound location techniques including techniques for acoustic location. In this example, a determination is made as to the location of ambulance 130 and police officer 134 with respect to automobile 112.

Automotive computer system 138 displays a visual indicator for ambulance 130 and police officer 134. These visual indicators are displayed by an electronic display system to augment a live view of the environment seen through windows in automobile 112 by occupant 140 of automobile 112. These windows can include the windshield, windows on the sides of automobile 112, or other windows in automobile 112. Occupant 140 can be the driver or passenger in automobile 112.

In this illustrative example, the visual indicators for these two objects of interest are displayed in a manner that draws attention to the location of the objects of interest in the live view. In this example, a visual indicator for ambulance 130 is be displayed in association with the live view of ambulance 130. For example, the visual indicator can be displayed to overlay ambulance 130, or displayed to be adjacent to ambulance 130, or displayed in some other manner that draws attention to the location of ambulance 130 in the live view from automobile 112.

In a similar fashion, a visual indicator for police officer 134 can be displayed in the windows as an augmentation to the live view of police officer 134. Thus, an augmented reality display is provided to occupant 140 in automobile 112.

Automotive computer systems and microphones can be implemented in other client devices such as automobile 114 and automobile 116. Further, automotive computer can increase accuracy in locating the source of sounds for objects of interest using sound data from additional sources such as automobile 114 and automobile 116. For example, crowd sourcing applications in other vehicles can provide additional sound data 230.

In another illustrative example, the analysis of sound data and display of visual indicators to ambulance 130 and police officer 134 can be performed by a client device in an automobile. For example, at least one of mobile phone 118, tablet computer 120, or smart glasses 122 can be used inside of automobile 112 and perform the analysis of sound data and displaying visual indicators in place of automotive computer.

The illustrative example enables a driver to view information about sound sources while maintaining viewing the environment outside of a vehicle. This view reduces a distraction of looking at a display within the vehicle while driving.

In yet another illustrative example, automotive computer system 138 can send the sound data to at least one of server computer 104 or server computer 106 for analysis to determine the location of ambulance 130 and police officer 134. In yet other illustrative examples, automotive computers in other vehicles, such as automotive computer 142 in automobile 114 or automotive computer 144 in automobile 116 can receive the sound data and perform the analysis of the sound data.

Figure 2:
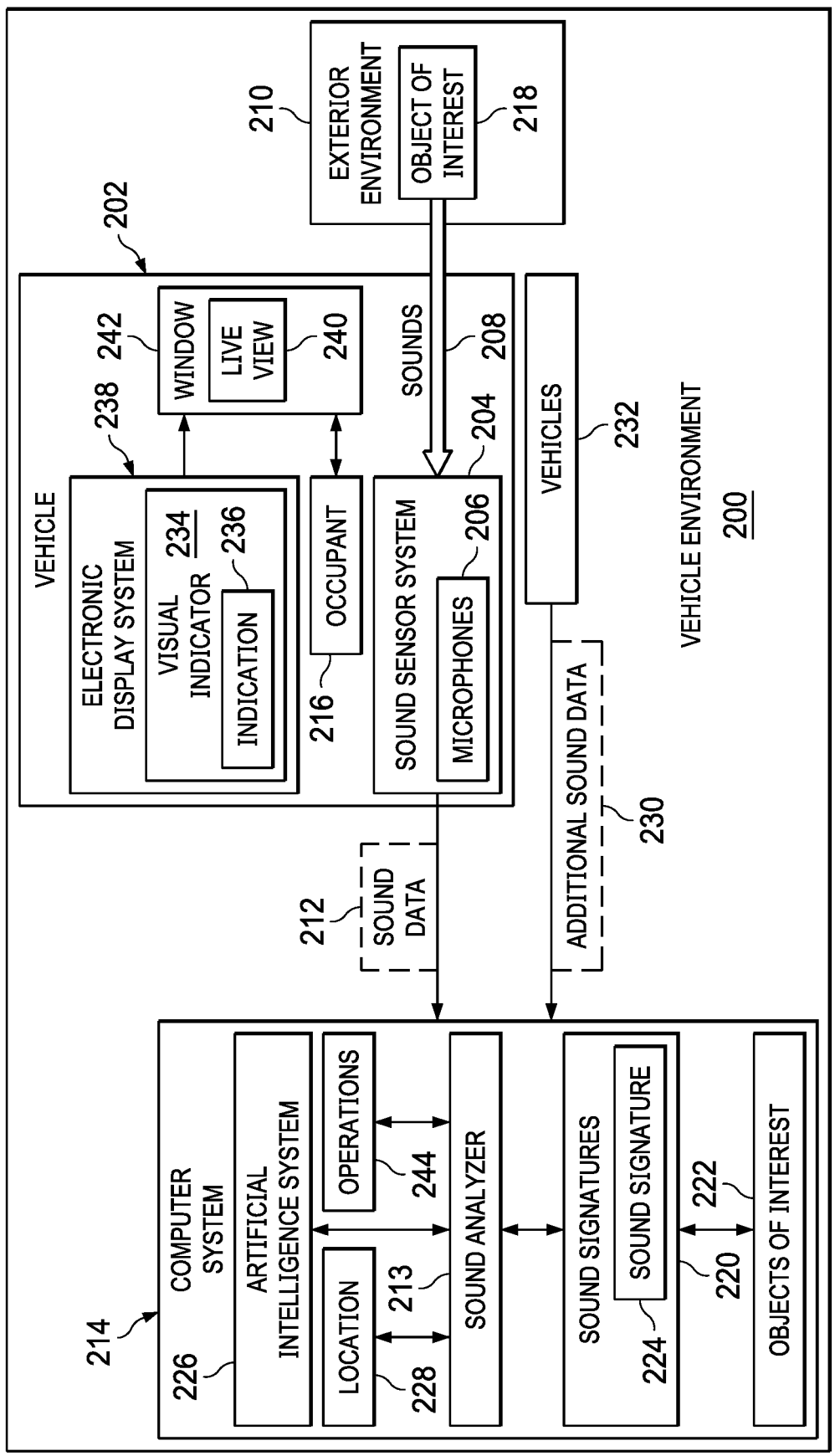
FIG. 2 is a block diagram of a vehicle environment in accordance with an illustrative embodiment.

With reference now to FIG. 2, a block diagram of a vehicle environment is depicted in accordance with an illustrative embodiment. In this illustrative example, vehicle environment 200 includes components that can be implemented in hardware such as the hardware shown in network data processing system 100 in FIG. 1.

Vehicle environment 200 includes vehicle 202 sound sensor system 204. In this example, sound sensor system 204 comprises microphones 206 connected to vehicle 202. Microphones 206 are located on vehicle 202 in locations to detect sounds 208 in exterior environment 210 around vehicle 202. In response to detecting sounds 208, microphones 206 generate sound data 212.

In this illustrative example, sound data 212 is received by sound analyzer 213 in computer system 214 from sound sensor system 204. Sound data 212 is for sounds 208 detected in exterior environment 210 around vehicle 202.

Computer system 214 is a physical hardware system and includes one or more data processing systems. When more than one data processing system is present in computer system 214, those data processing systems are in communication with each other using a communications medium. The communications medium can be a network. The data processing systems can be selected from at least one of a computer, a server computer, a tablet computer, or some other suitable data processing system.

In this example, computer system 214 can be a set of vehicle computers in vehicle 202. Sound analyzer 213 can be located in one or more of the vehicle computers.

Alternatively, computer system 214 can be one or more data processing systems carried or worn by occupant 216 in vehicle 202. Occupant 216 can be a driver or passenger. Computer system can be a mobile phone, a tablet computer, smart glasses, or other suitable portable computing device. In yet another illustrative example, computer system 214 can be an automotive computer in the vehicle and a set of computers in a remote location in communication with the automotive computer.

As depicted, sound analyzer 213 in computer system 214 analyzes sound data 212 for a presence of object of interest 218. Object of interest is selected from a group comprising an automobile, a fire truck, an ambulance, a police officer, a semi-trailer truck, a train, and other suitable objects for which identifying a presence is desirable.

This analysis can be performed in a number of different ways. For example, sound analyzer 213 can compare sound data 212 to a set of sound signatures 220 for a set of objects of interest 222. Sound analyzer 213 determines whether sound data 212 matches sound signature 224 in the set of sound signatures 220 for object of interest 218 in the set of objects of interest 222.

In another illustrative example, artificial intelligence system 226 is located in or in communication with sound analyzer 213 in computer system 214. Artificial intelligence system 226 can be used analyze sound data 212 for the presence of object of interest 218.

An artificial intelligence system is a system that has intelligent behavior and can be based on function of the human brain. An artificial intelligence system comprises at least one of an artificial neural network, cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

In the illustrative example, sound analyzer 213 determines location 228 of object of interest 218 with respect to vehicle 202 using sound data 212 in response to detecting the presence of object of interest 218. In this illustrative example, location 228 is a direction to object of interest 218 relative to vehicle 202. In some illustrative examples, location 228 can also include a distance to vehicle 202.

In determining location 228, sound analyzer 213 can measure a time received and a level of sound for the sound generated by the object of interest 218 from microphones 206 in sound sensor system 204. Sound analyzer 213 can analyze times received and levels of sound from microphones to determine location 228 of object of interest 218. In the illustrative example, sound analyzer 213 can analyze the times and levels of sound from microphones 206 to determine location 228 of object of interest 218 using at least one of an acoustic location process or a three-dimensional sound localization process. a time difference of arrival process, a direction of arrival process, a triangulation process, a steered response power method, or some other suitable process.

Sound analyzer 213 can determine location 228 of object of interest 218 with respect to vehicle 202 using sound data 212 from sound sensor system 204 and additional sound data 230 from a set of vehicles 232 having sound sensor systems in response to detecting the presence of the object of interest 218.

The computer system displays visual indicator 234 for object of interest 218 with indication 236 of location 228 of object of interest 222 using electronic display system 238 in vehicle 202. As depicted in this example, electronic display system 238 is selected from at least one of a heads-up display, a mobile phone, a tablet computer, smart glasses, or some other display device located inside of vehicle 202 that can that can provide occupant 216 an augmented realty display. This display of visual indicator 234 for object of interest 218 with indication 236 of location 228 of object of interest 222 augments live view 240 of exterior environment 210 seen through window 242 of vehicle 202 for the in-vehicle display of the information for object of interest 218 to draw attention to object of interest 222 in live view 240.

In addition to displaying visual indicator 234 with indication 236 of location 228 of object of interest 218, computer system 214 can perform a set of operations 244. For example, responsive to detecting object of interest 222, sound analyzer 213 can perform the set of operations 244 selected from at least one of reducing a noise level from a sound source in the vehicle, amplifying the sound from object of interest 222 inside a cabin of vehicle 202, displaying an instruction for an action to take with respect to object of interest 222, displaying text from a voice to text conversion from sound for object of interest 222 when object of interest 222 is a person.

Sound analyzer 213 can be implemented in software, hardware, firmware or a combination thereof. When software is used, the operations performed by sound analyzer 213 can be implemented in program code configured to run on hardware, such as a processor unit. When firmware is used, the operations performed by sound analyzer 213 can be implemented in program code and data and stored in persistent memory to run on a processor unit. When hardware is employed, the hardware may include circuits that operate to perform the operations in sound analyzer 213.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with a technical problem with the occupants of the vehicle detecting sounds in an exterior environment around vehicle. As a result, one or more technical solutions can provide a technical effect of providing an augmented reality display in which visual indicators draw the attention of an occupant of an automobile to the presence of an object of interest. One or more technical solutions can provide an ability to reduce the noise within the automobile in addition to displaying a visual indicator. One or more technical solutions also can amplify and play the portion of the sound data for the object of interest within vehicle.

Computer system 214 can be configured to perform at least one of the steps, operations, or actions described in the different illustrative examples using software, hardware, firmware or a combination thereof. As a result, computer system 214 operates as a special purpose computer system in which sound analyzer 213 in computer system 214 enables occupant 216 of vehicle 202 to be more aware of exterior environment 210 through displaying visual indicators for objects of interest that generate sounds that should be taken into account while operating vehicle 202. In particular, sound analyzer 213 transforms computer system 214 into a special purpose computer system as compared to currently available general computer systems that do not have sound analyzer 213.

The illustrative example enables a driver to view information about sound sources while maintaining a view of the environment outside of a vehicle. This view reduces a distraction of looking at a display within the vehicle while driving.

The illustration of vehicle environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
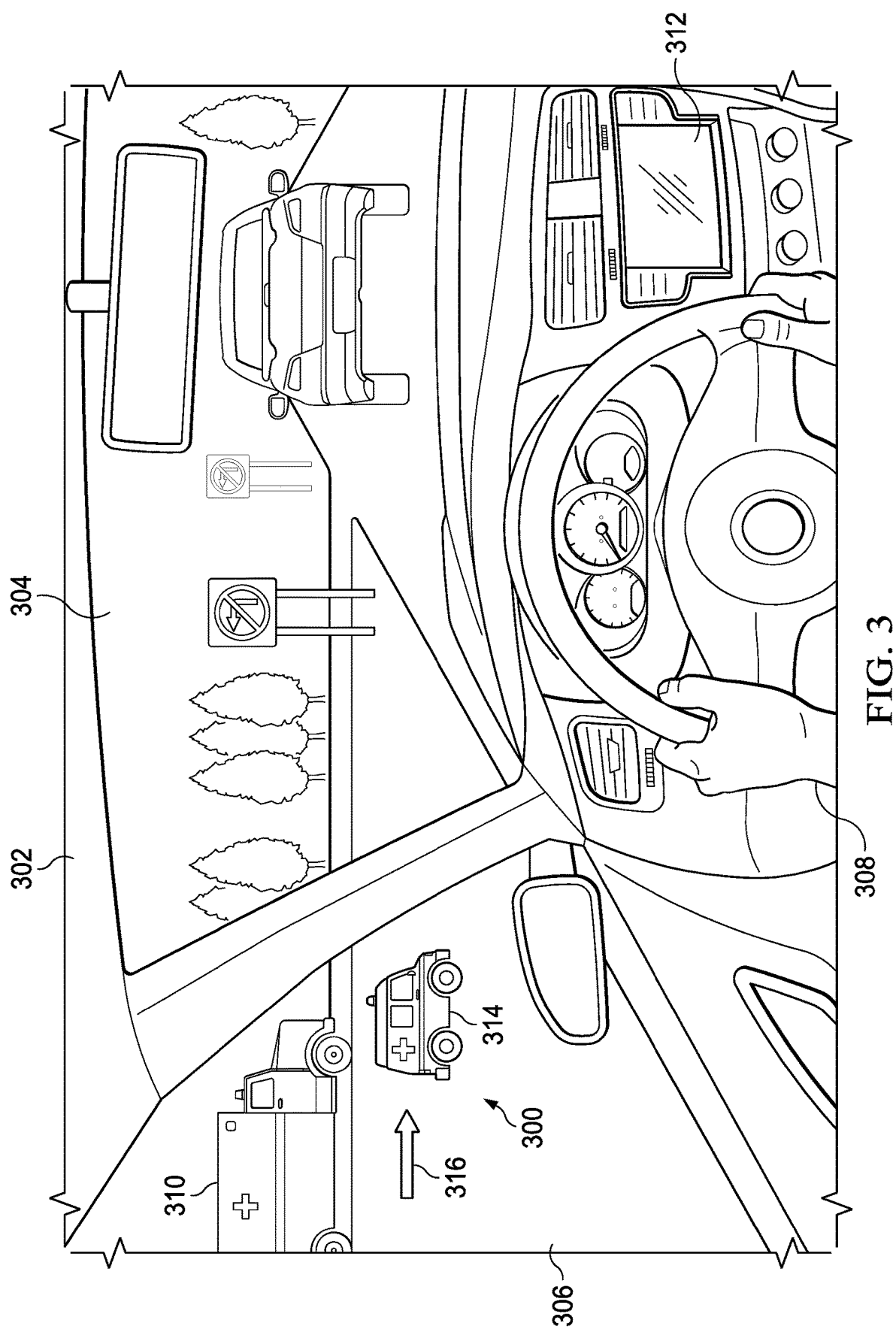
FIG. 3 is display of visual indicator for an ambulance on a heads up display in accordance with an illustrative embodiment.

With reference now to FIG. 3, a display of visual indicator for an ambulance on a heads-up display is depicted in accordance with an illustrative embodiment. In this illustrative example, the electronic display system is a heads-up display (HUD) 300 in automobile 302. Heads up display 300 is a transparent display that displays data without requiring users to look away from their viewpoints. As depicted, heads up display 300 is an example of one implementation for electronic display system 238 shown in block form in FIG. 2. Heads up display 300 can display data on windows such as windshield 304 and driver window 306 to driver 308. The display of this data on the windows is overlaid on a live view of the environment around automobile 302 to provide an augmented reality display to driver 308.

In this illustrative example, ambulance 310 is operating a siren. The sounds from the site are detected by microphones in automobile 302. In this example, ambulance 310 has been identified as an object of interest by automotive computer 312 in vehicle. Automotive computer 312 is an example of a computing device that may be used to be implemented or may be part of computer system 214 shown in block form in FIG. 2.

Depending on the interior and exterior noise, driver 308 may not notice the presence of ambulance 310. As depicted, automotive computer 312 displays ambulance icon 314 on driver window 306 using heads a display 300 to provide an augmented reality display to driver 308. Ambulance icon 314 is an example of an implementation for visual indicator 234 shown in block form in FIG. 2.

In this illustrative example, ambulance icon 314 is selected to provide a visual indication to driver 308 that an ambulance present. For example, at least one of the color and size of ambulance icon 314 can be selected to draw the attention of driver 308. Further, animation can also be used for ambulance icon 314 to draw the attention of driver 308.

As depicted, ambulance icon 314 also provides an indication of the location of ambulance 310. This indication can be provided in a number of different ways. For example, the selection of a window in automobile 302 can provide an indication of the location of ambulance 310. Further in this illustrative example, the indication of the location can be provided through the display of ambulance icon 314 in association with ambulance 310. For example, ambulance icon 314 is displayed next to overlapping the ambulance 310 in the live view of the exterior environment around automobile 302.

In this illustrative example, ambulance icon 314 can move as ambulance 310 moves to indicate the current location of ambulance 310. Additionally, ambulance 310 is moving in the direction of arrow 316. Ambulance icon 314 can also move in the direction of arrow 316 to indicate the current location of ambulance 310 as ambulance 310 moves. Further, arrow 316 can also be displayed on driver window 306 by heads up display 300 to indicate a direction of travel for ambulance 310.

If ambulance 310 is not visible to driver 308 through driver window 306, windshield 304, or the passenger window (not shown), ambulance icon 314 can be displayed to indicate that ambulance 310 is out of the field of view for driver 308. In this illustrative example, the number of windows available for displaying visual indicators may be based on the extent of the heads-up display system or a desire to avoid driver 308 looking in undesired directions while operating automobile 302.

For example, if ambulance 310 is farther to the left and out of view from driver window 306, ambulance icon 314 can be displayed farther to the left and in a manner that indicates that ambulance 310 is out of view. Ambulance icon 314 can be displayed using a different color. As another example, ambulance icon 314 can be displayed with animation or shown as flashing to indicate that ambulance 310 is out of view of driver 310. Another example, arrow 316 can be displayed pointing to the left to indicate the location of ambulance 310 when ambulance 310 is out of view of driver 308.

Figure 4:
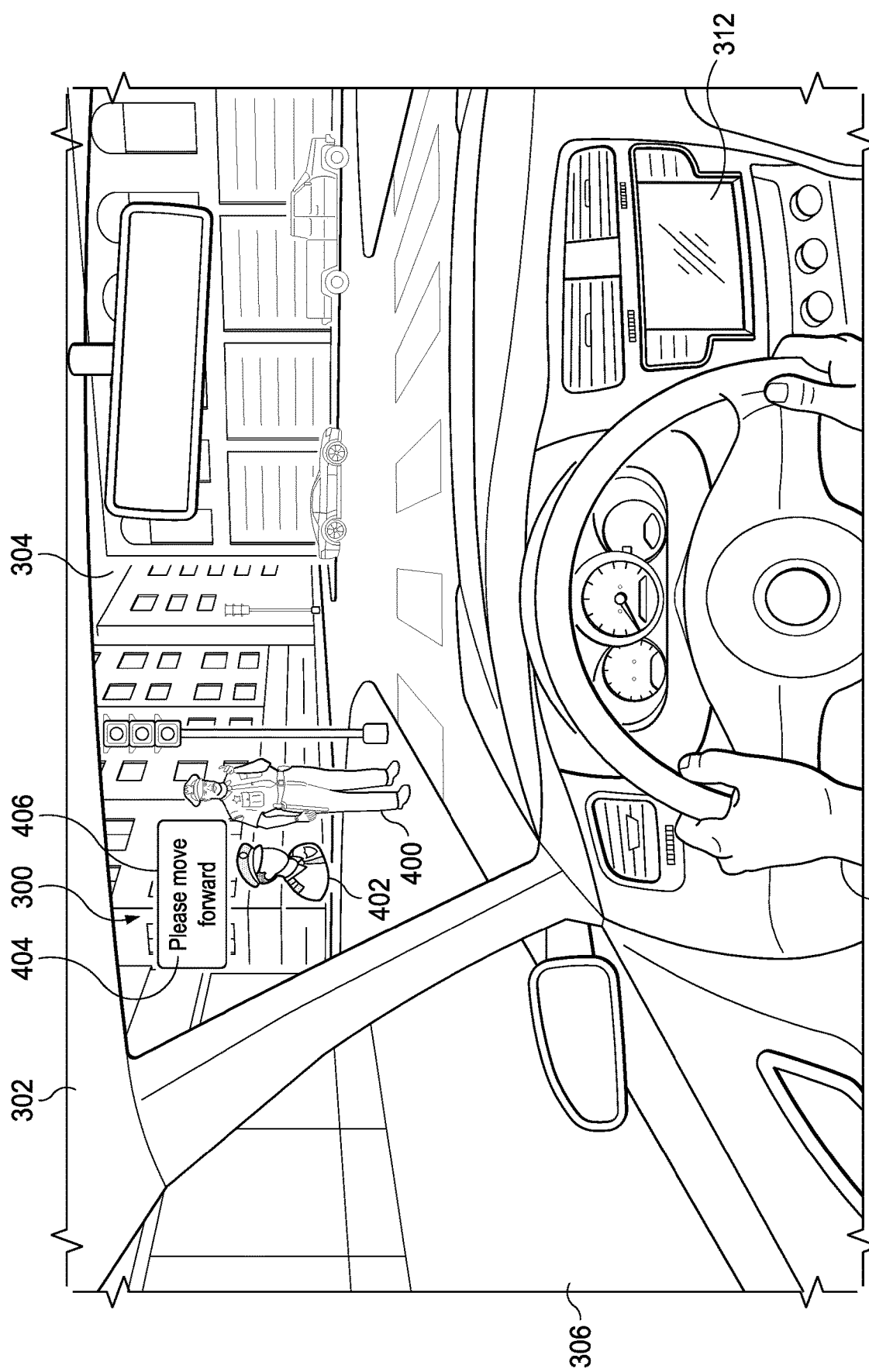
FIG. 4 is a display of visual indicator for a police officer on a heads up display in accordance with an illustrative embodiment.

Turning now to FIG. 4, a display of visual indicator for a police officer on a heads-up display is depicted in accordance with an illustrative embodiment. In this figure, sounds from police officer 400 are detected by the microphones in automobile 302. The sound data has been analyzed by automotive computer 312 to identify the police officer 400 as an object of interest.

In this illustrative example, police officer icon 402 is displayed by heads up display 300 on windshield 304 of automobile 302. Police officer icon 402 is an example of an implementation of visual indicator 234 shown in block form in FIG. 2. This display of police officer icon 402 on the live view seen through windshield 304 provides an augmented reality display that allows driver to focus on the live view without turning focus to a display device located within automobile 302.

Further, police officer icon 402 is displayed in association with police officer 400. In other words, the location of police officer icon 402 displayed on windshield 304 draws attention to police officer 400 in the live view outside of automobile 302. Thus, in addition to being a visual indicator of the presence of police officer 400, the display of police officer icon 402 indicates the location of police officer 400 in this augmented reality display to driver 308.

In this illustrative example, additional operations can be performed in addition to displaying visual indicator through police officer icon 402. For example, the sound from police officer 400 can be analyzed. In this illustrative example, an artificial intelligence system in communication with automotive computer 312 can determine that police officer 400 is providing directions from analyzing the sound data. As depicted, those directions can be converted from audio to text using audio to text conversion processes that are currently available. In this illustrative example, direction 404 is detected and displayed in window 406 on windshield 304 on heads up display 300. This example, direction 404 is "Please move forward".

In this manner, driver 308 can be alerted to the presence of police officer 400 even if driver 308 cannot hear police officer 400. Additionally, instructions given by police officer 400 can be displayed as part of an augmented reality display to driver 308.

Figure 5:
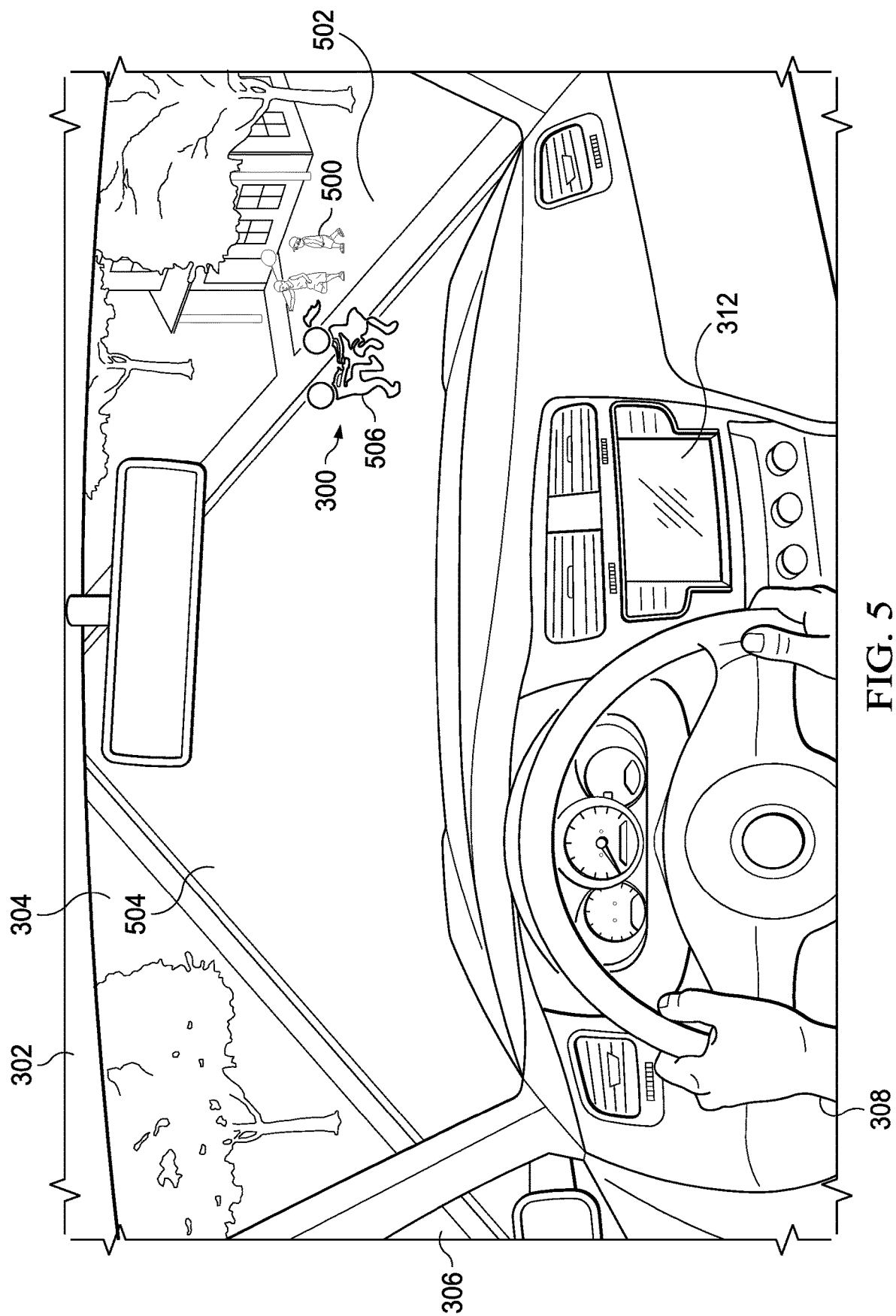
FIG. 5 is a display of visual indicator for people on a heads up display in accordance with an illustrative embodiment.

With reference next to FIG. 5, a display of visual indicator for people on a heads-up display is depicted in accordance with an illustrative embodiment. In this example, microphones in automobile 302 to have detected sounds from young people 500 playing in yard 502 next to road 504. The sounds are analyzed by automotive computer 312 which determines that young people 500 are objects of interest.

In this illustrative example, young people icon 506 to is displayed in association with young people 500 on windshield 304 by a heads up display 300. Young people icon 506 is an example of an implementation of visual indicator 234 shown in block form in FIG. 2. The location of young people icon 506 is selected to indicate the location of young people 500.

Figure 6:
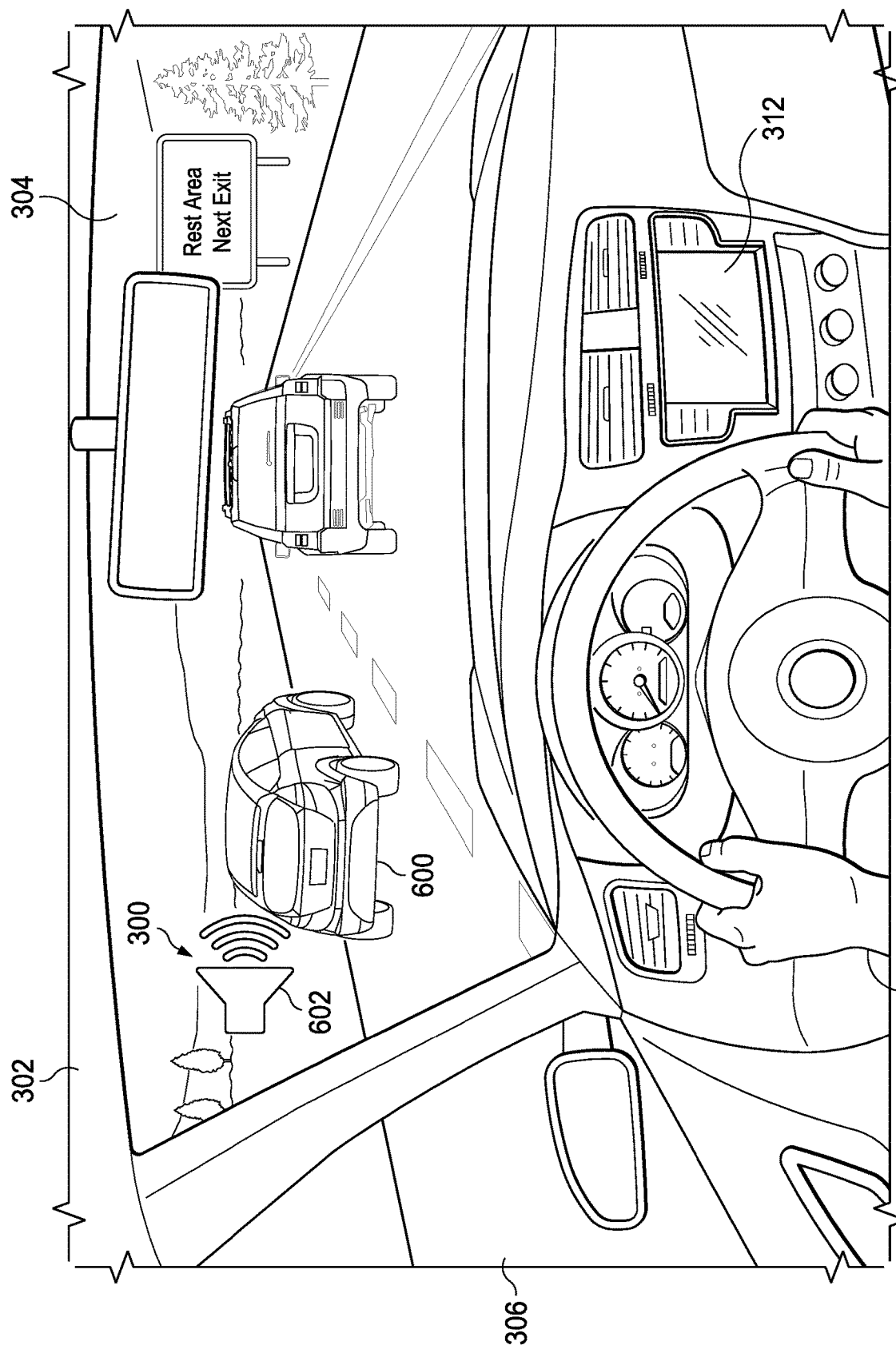
FIG. 6 is a display of visual indicator for an automobile on a heads up display in accordance with an illustrative embodiment.

Turning now to FIG. 6, a display of a visual indicator for an automobile on a heads-up display is depicted in accordance with an illustrative embodiment. In this illustrative example, microphones have detected sounds from automobile 600 seen in the live view through windshield 304. In this illustrative example, the sounds are from a horn on automobile 600. Automotive computer 312 analyzes the data generated by the microphones to determine that automobile 600 is an object of interest.

In this example, automotive computer 312 displays horn icon 602, which is an example of an implementation of visual indicator 234 shown in block form in FIG. 2. In this depicted example, horn icon 602 is displayed in association with automobile 600 to draw attention to automobile 600. Further, horn icon 602 indicates a location of automobile 600 that is the object of interest generating sound. Further, horn icon 602 indicates that automobile 600 has activated its horn.

In this example, an automobile icon is not used because automobile 600 can be easily seen in the live view through windshield 304. Horn icon 602 is used indicate that automobile 600 has activated a horn. Horn icon 602 is displayed in a location on windshield 304 by a heads up display 300 that indicate which automobile is generating the horn sound.

The illustration of visual indicators in FIGS. 3-6 have been provided as examples of one implementation for how visual indicator 234 can be displayed by sound analyzer 213 using electronic display system 238 in FIG. 2. This illustration is not meant to limit the manner in which other illustrative examples can be implemented. For example, in other examples, text may also be displayed in association with an icon to provide additional information about an object of interest. In yet other illustrative examples, the visual indicators can be displayed on smart glasses used by driver 308 or on a tablet computer used by a passenger.

Figure 7:
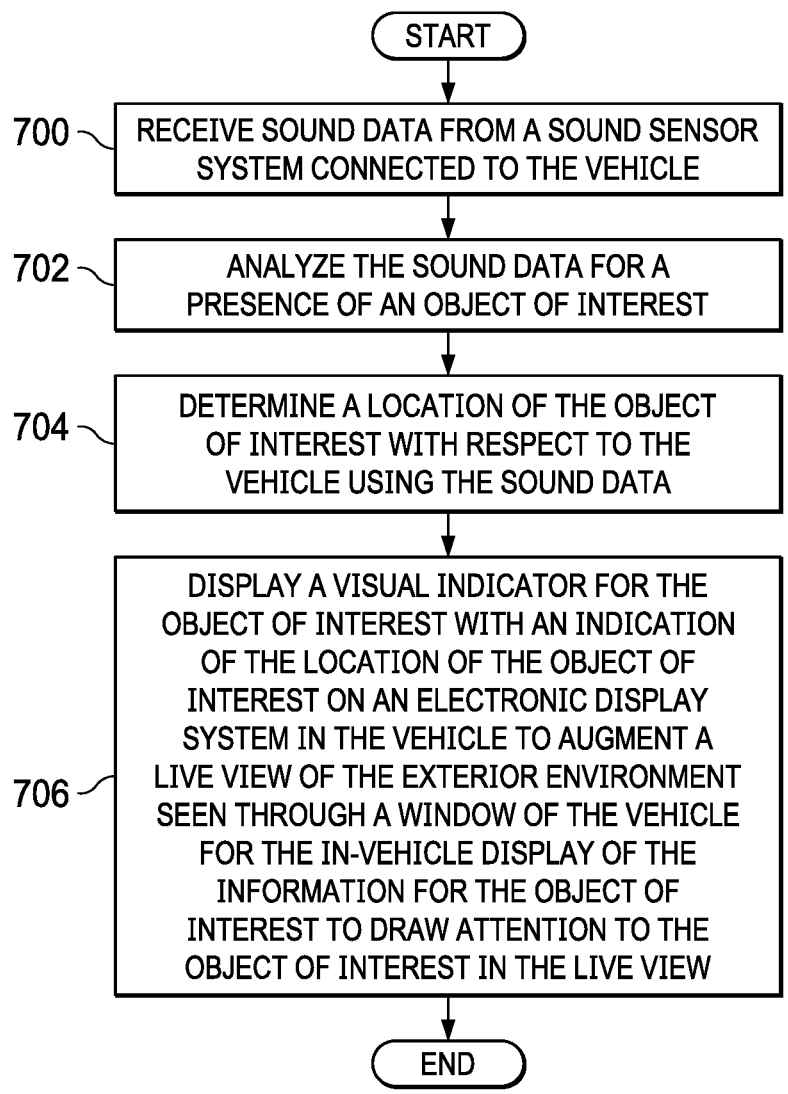
FIG. 7 is a flowchart of a process for an in-vehicle display of information for an object of interest in accordance with an illustrative embodiment.

Turning next to FIG. 7, a flowchart of a process for an in-vehicle display of information for an object of interest is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, this process can be implemented in sound analyzer 213 in computer system 214 in FIG. 2.

The process begins by receiving sound data from a sound sensor system connected to the vehicle (step 700). The sound data is for sounds detected in an exterior environment around the vehicle. The process analyzes the sound data for a presence of an object of interest (step 702).

In response to detecting the presence of the object of interest, the process determines a location of the object of interest with respect to the vehicle using the sound data (step 704). The process displays a visual indicator for the object of interest with an indication of the location of the object of interest on an electronic display system in the vehicle to augment a live view of the exterior environment seen through a window of the vehicle for the in-vehicle display of the information for the object of interest to draw attention to the object of interest in the live view (step 706). The process terminates thereafter.

Figure 8:
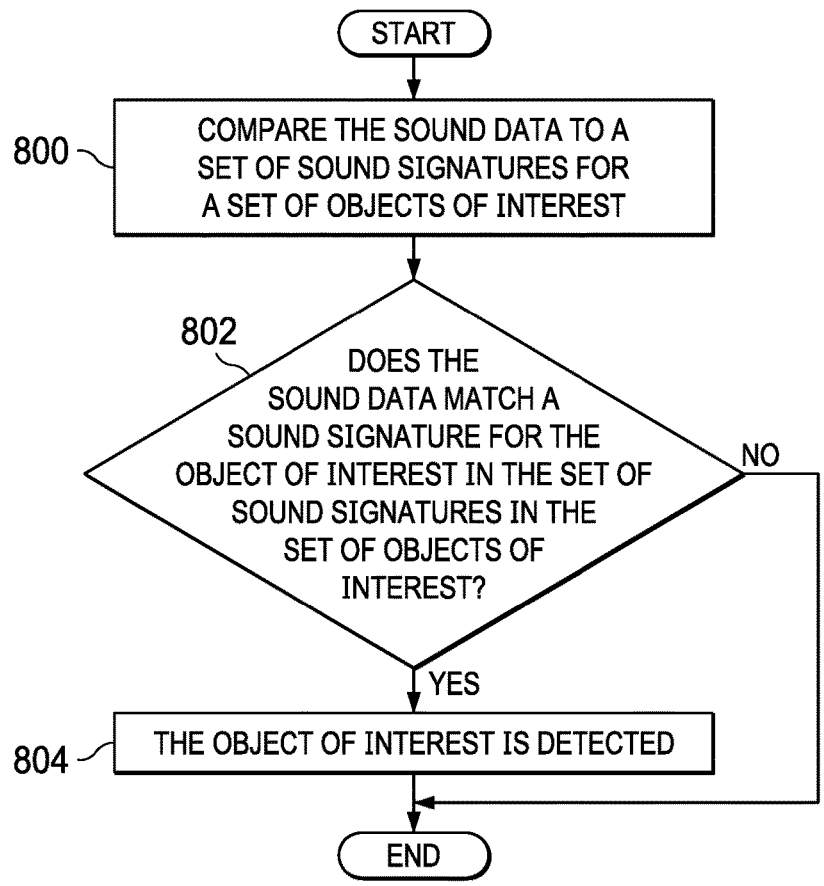
FIG. 8 is a flowchart of a process for determining whether an object of interest is present in accordance with an illustrative embodiment.

In FIG. 8, a flowchart of a process for determining whether an object of interest is present is depicted in accordance with an illustrative embodiment. The process illustrated in FIG. 8 is an example of one implementation for step 702 in FIG. 7.

The process begins by comparing the sound data to a set of sound signatures for a set of objects of interest (step 800). The process determines whether the sound data matches a sound signature for the object of interest in the set of sound signatures in the set of objects of interest (step 802). If a match is present, the object of interest is detected (step 804). Otherwise, the process terminates without detecting an object of interest.

Figure 9:
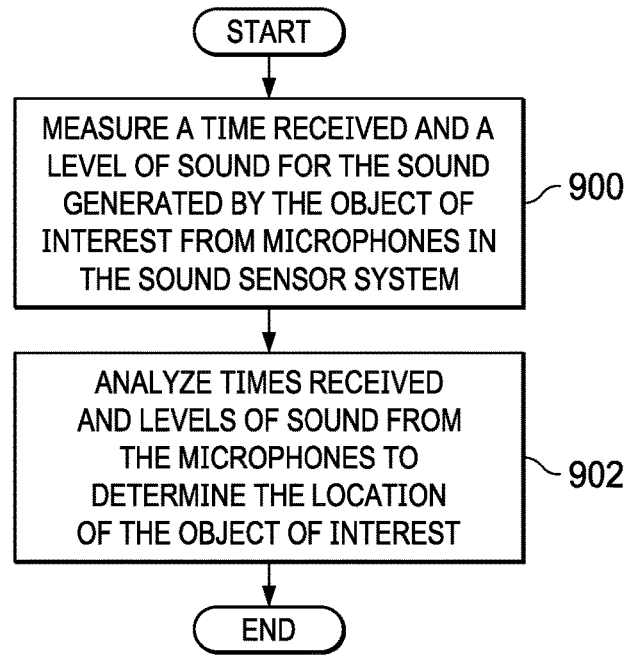
FIG. 9 is a flowchart of a process for determining a location of a vehicle in accordance with an illustrative embodiment.

Turning next to FIG. 9, a flowchart of a process for determining a location of a vehicle is depicted in accordance with an illustrative embodiment. The process illustrated in FIG. 9 is an example of one implementation for step 704 in FIG. 7.

The process begins by measuring a time received and a level of sound for the sound generated by the object of interest from microphones in the sound sensor system (step 900). The process analyzing times received and levels of sound from the microphones to determine the location of the object of interest (step 902). The process terminates thereafter.

Figure 10:
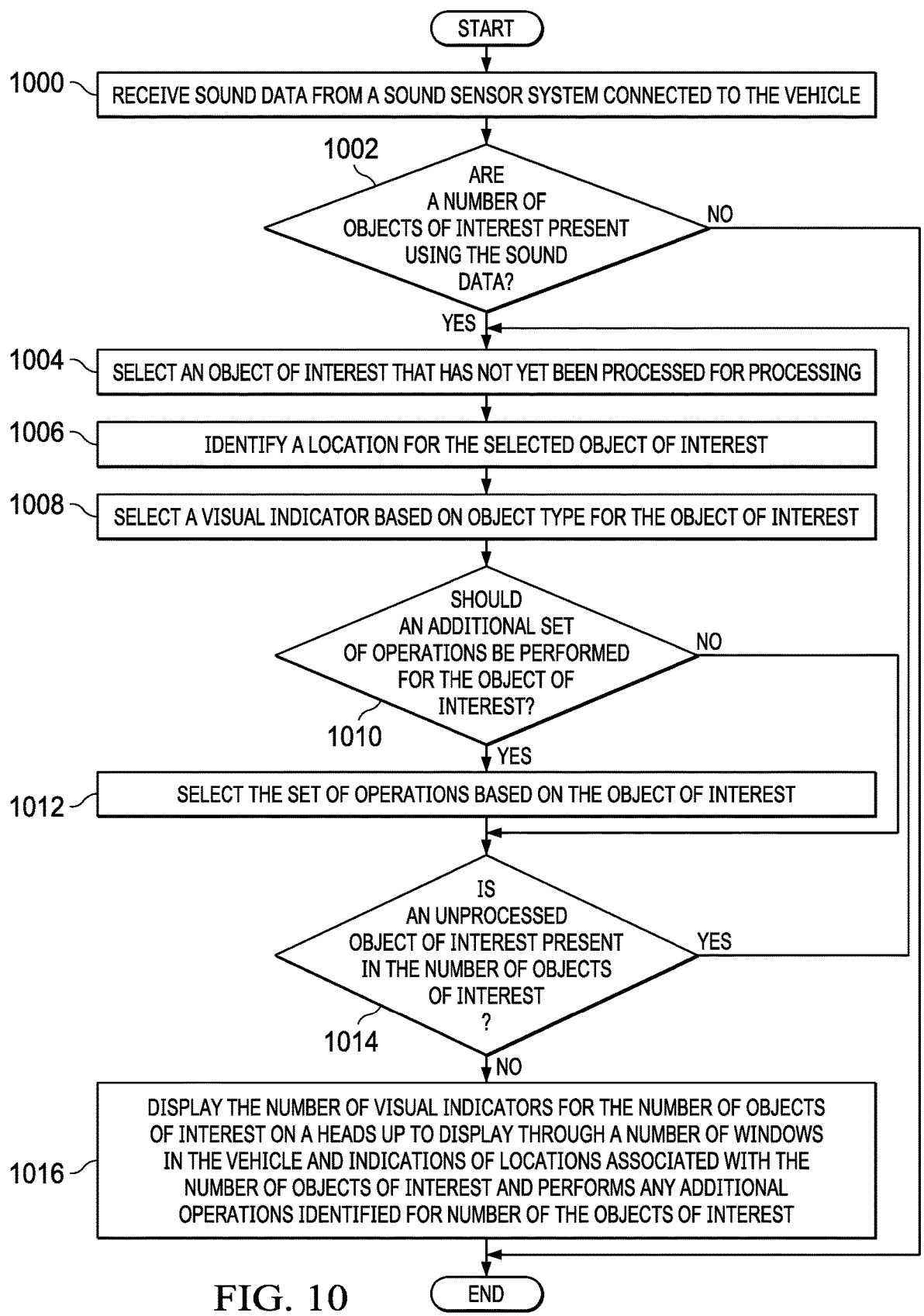
FIG. 10 is a more detailed flowchart of a process for an in-vehicle display of information for an object of interest in accordance with an illustrative embodiment.

Turning next to FIG. 10, a more detailed flowchart of a process for an in-vehicle display of information for an object of interest is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in sound analyzer 213 in computer system 214 in FIG. 2.

The process begins by receiving sound data from a sound sensor system connected to the vehicle (step 1000). The sound data is for sounds detected in an exterior environment around the vehicle. The process determines whether a number of objects of interest are present using the sound data (step 1002). The determination step 1002 can be performed in a number of different ways. For example, the sound data can be compared to sound signatures for objects of interest. In another illustrative example, an artificial intelligence system can analyze the sound to determine whether a number of objects of interest is present. The artificial intelligence can be trained using machine learning to detect objects of interest.

If a number of objects of interests are present, the process selects an object of interest that has not yet been processed for processing (step 1004). Process identifies a location for the selected object of interest (step 1006). The location can be identified using the sound data. In some illustrative examples, the location of the object of interest can be identified by also using additional sound data from other sources such as other vehicles. These other sources could also include microphones located at signs or light signals.

The process selects a visual indicator based on object type for the object of interest (step 1008). The visual indicator can be an icon representing the object of interest or some other suitable type of visual indicator. For example, a fire truck icon can be used as a visual indicator for an object of interest in the form of a fire truck.

The process determines whether an additional set of operations should be performed for the object of interest (step 1010). This determination can be performed in a number of different ways. For example, an artificial intelligence system can analyze the sound for the object of interest to determine whether an additional set of operations should be performed.

If an additional set of operations should be performed for the object of interest, the process selects the set of operations based on the object of interest (step 1012). For example, if the object of interest is a fireman person giving instructions, the process can convert the audio instructions into text. As another example, if the object of interest is an emergency response vehicle, the process can identify actions that the driver should take for the particular type of emergency response vehicle. For example, the actions could be instructions to slow down and pullover to a curb, change into another lane, turn into a parking lot, or some other suitable action. In another illustrative example, the process isolates the sound from the object of interest from other sounds in the sound data. This isolated sound can be replayed at a higher volume within the vehicle. As another illustrative example, the operation can include reducing sound sources within the vehicle. The sound sources can be a radio, a movie played on entertainment system, or some other sound source within the vehicle.

Next, a determination is made as to whether an unprocessed object of interest is present in the number of objects of interest (step 1014). If another unprocessed object of interest is present, the process returns to step 1004.

With reference again to step 1010, if an additional set of operations is not to be performed for the object of interest, the process proceeds directly to step 1014. With reference back to step 1014, if an unprocessed object of interest is not present in the number of objects of interest, the process displays the number of visual indicators for the number of objects of interest on a heads up to display through a number of windows in the vehicle and indications of locations associated with the number of objects of interest and performs any additional operations identified for number of the objects of interest. (step 1014). The process terminates thereafter.

With reference again to step 1002, if the number of objects of interest are not present, the process terminates. Thus, a live view of the exterior environment seen from within the vehicle can be augmented with information to draw attention to objects of interest generating sound that may not be detected by occupants within the vehicle.

Figure 11:
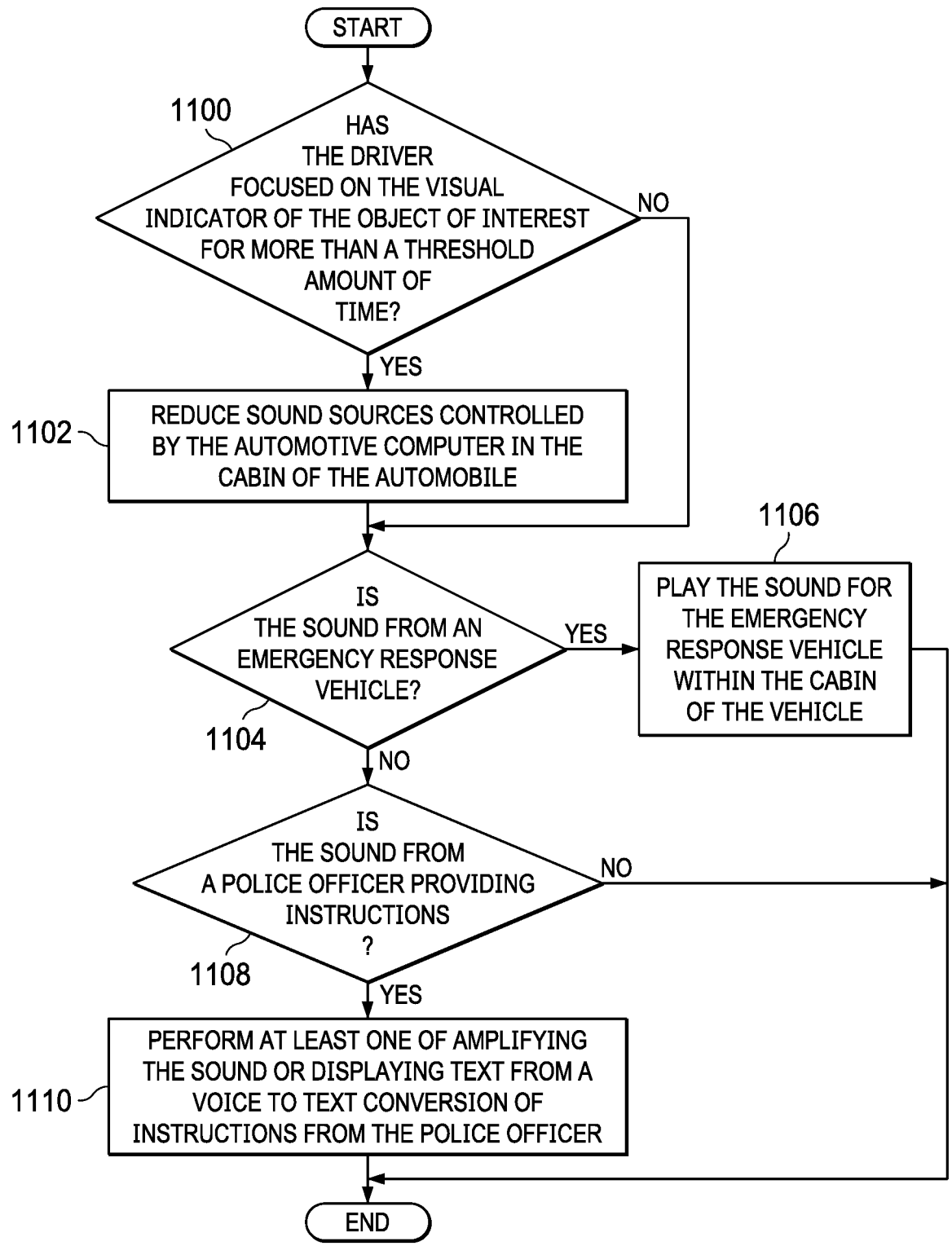
FIG. 11 is a flowchart of a process for managing sounds the cabin of a vehicle in accordance with an illustrative embodiment.

With reference now to FIG. 11, a flowchart of a process for managing sounds in the cabin of a vehicle is depicted in accordance with an illustrative embodiment. The process illustrated in FIG. 5 is an example of one manner which step 1014 can be performed. Further, the process in this flowchart can also be implemented as an additional step in the flowchart in FIG. 7.

The process begins by determining whether the driver has focused on the visual indicator of the object of interest for more than a threshold amount of time (step 1100). This threshold amount of time can be, for example, 700 ms or some other suitable amount of time for the driver to focus on an object.

Step 1100 can be implemented using currently available eye tracking processes. The point of gaze can be correlated to a location on the windshield. That location can be compared to the location of the visual indicator to determine whether the driver is focused in the visual indicator. This process can be implemented using optical eye tracking processes that measure eye motion with a camera or some other optical sensor.

If the driver has focused on the visual indicator for more than threshold amount of time, sound sources controlled by the automotive computer in the cabin of the automobile are reduced (step 1102). Next, a determination is made as to whether the sound is from an emergency response vehicle (step 1104). If the sound is from an emergency response vehicle, the process plays the sound for the emergency response vehicle within the cabin of the vehicle (step 1106). The process terminates thereafter.

In step 1104, if the sound is not from an emergency response vehicle, a determination is made as to whether the sound is from a police officer providing instructions (step 1108). If the sound is from a police officer providing instructions, at least one of amplifying the sound or displaying text from a voice to text conversion of instructions from the police officer is performed (step 1110). The process terminates thereafter.

With reference again to step 1108, if the sound is not from the police officer, the process terminates. With reference again to step 1102, if the driver is not focused on the visual indicator of more than a threshold matter of time, the process proceeds directly to step 1104. This process can be performed any number of times when sound data is received for processing.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, the implementation of step 702 can be implemented using an artificial intelligence system in place of or in addition to comparing the sound data to a set of sound signatures. As another example, in step 1104 in FIG. 11, the determination can also include determining whether the sound is lower than some threshold level. If the amplitude of the sound is great enough, then increasing the sample may be unnecessary.

Figure 12:
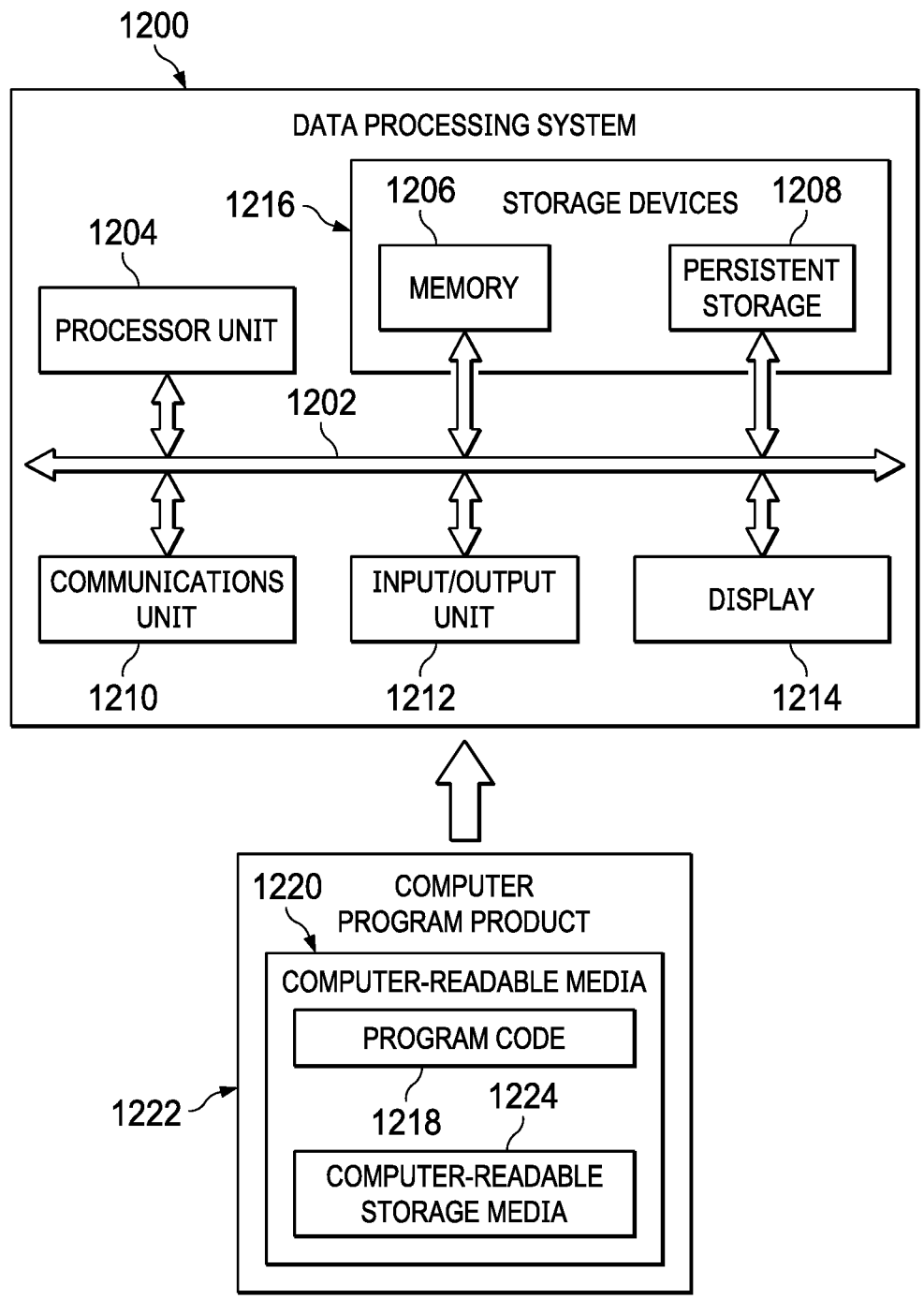
FIG. 12 is a block diagram of a data processing system is depicted in accordance with an illustrative embodiment.

Turning now to FIG. 12, a block diagram of a data processing system is depicted in accordance with an illustrative embodiment. Data processing system 1200 can be used to implement server computer 104, server computer 106, and client devices 110 in FIG. 1. Data processing system 1200 can also be used to implement computer system 214 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and processed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for processing by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, illustrative embodiments of the present invention provide a computer implemented method, computer system, and computer program product for providing an in-vehicle display of information for an object of interest. Sound data is received from a sound sensor system connected to the vehicle. The sound data is for sounds detected in an exterior environment around the vehicle. The sound data is analyzed for a presence of an object of interest. The location of the object of interest is determined using the sound data in response to detecting the presence of the object of interest. A visual indicator for the object of interest is displayed using an electronic display system in the vehicle to augment a live view of the exterior environment seen through a window of the vehicle for the in-vehicle display of the information for the object of interest to draw attention to the object of interest in the live view.

One or more illustrative examples enables overcoming a problem with the occupants of the vehicle being unable to detect sounds in an exterior environment around vehicle. One or more illustrative examples enable alerting an occupant that an object of interest is present outside of the vehicle by analyzing sound data generated from sounds from the exterior the vehicle detected by microphones. In this manner, one or more illustrative examples enable an occupant to take appropriate actions when an object of interest is identified and a visual indicator is displayed to draw the attention of the topic to the object of interest. Thus, one or more illustrative examples aid an occupant of a vehicle to be more aware of the exterior environment around vehicle through displaying visual indicators for objects of interest that generate sounds that should be taken into account while operating the vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for an in-vehicle display of information for an object of interest, the method comprising: receiving, by a computer system, sound data from a sound sensor system connected to a vehicle, wherein the sound data is for sounds detected in an exterior environment around the vehicle; analyzing, by the computer system, the sound data for a presence of an object of interest; in response to detecting the presence of the object of interest, determining, by the computer system, a location of the object of interest with respect to the vehicle using the sound data; displaying, by the computer system, a visual indicator for the object of interest with an indication of the location of the object of interest using an electronic display system in the vehicle to augment a live view of the exterior environment seen directly by an occupant through a window of the vehicle for the in-vehicle display of the information for the object of interest, wherein the displaying of the visual indicator for the object of interest with the location of the object of interest is overlaid on the live view to draw attention to the object of interest in the live view outside the vehicle; displaying, using the electronic display system in the vehicle to augment the live view of the exterior environment seen directly by the occupant through the window of the vehicle, a direction of travel of the object of interest whose presence was detected by the analyzing of the sound data responsive to detecting the object of interest whose presence was detected by the analyzing of the sound data, wherein the displaying of the visual indicator for the object of interest is overlaid on the object of interest in the live view to draw attention to the object of interest in the live view outside the vehicle; and displaying text from a voice to text conversion of the sound from the object of interest when the object of interest is a person using the electronic display system in the vehicle to augment the live view of the exterior environment seen directly by the occupant through the window of the vehicle.

2. The method of claim 1, wherein analyzing, by the computer system, the sound data for the presence of an object of interest comprises: comparing, by the computer system, the sound data to a plurality of sound signatures for a plurality of objects of interest; and determining, by the computer system, whether the sound data matches a sound signature for the object of interest in the plurality of sound signatures for the plurality of objects of interest.

3. The method of claim 1, further comprising:
in response to receiving the sound data by the computer, determining whether multiple objects of interest are present using the sound data;
in response to determining that multiple objects of interest are present, (i) selecting a particular one of the multiple objects of interest as being the object of interest for which the location thereof is determined per the determining the location step, and for which the visual indicator and the indication of the location thereof is displayed per the displaying step; and (ii) repeating the selecting for all remaining of the multiple objects such that a respective visual indicator and respective indication of the location for each of a plurality of objects of interest are displayed using the electronic display system in the vehicle to augment the live view of the external environment seen directly by the occupant through the window of the vehicle.

4. The method of claim 1, wherein the computer system comprises a plurality of data processing systems, including a remote data processing system and the sound sensor system, that are in communication with each other using a communication medium, and wherein receiving, by the computer system, the sound data from the sound sensor system connected to the vehicle comprises receiving, by the remote data processing system of the computer system, the sound data from the sound sensor system connected to the vehicle; and further comprising:
receiving, by the remote data processing system of the computer system, additional sound data from a set of vehicles having sound sensor systems; wherein determining, by the computer system, the location of the object of interest with respect to the vehicle using the sound data from the sound sensor system in response to detecting the presence of the object of interest comprises:
determining, by the remote data processing system of the computer system, the location of the object of interest with respect to the vehicle using the sound data from the sound sensor system and the additional sound data from the set of vehicles having the sound sensor systems in response to detecting the presence of the object of interest.

5. The method of claim 1, wherein determining, by the computer system, the location of the object of interest with respect to the vehicle using the sound data from the sound sensor system in response to detecting the presence of the object of interest comprises:
measuring, by the computer system, a time received and a level of sound for a sound generated by the object of interest from microphones in the sound sensor system; and
analyzing, by the computer system, times received and levels of sound from the microphones to determine the location of the object of interest, and wherein the indication of the location of the object of interest is provided through display of an object icon adjacent to the object of interest.

6. The method of claim 5, wherein analyzing, by the computer system, the times and levels of sound the microphones to determine the location of the object of interest comprises:
analyzing, by the computer system, the times and levels of sound from the microphones to determine the location of the object of interest using at least one of an acoustic location process or a three-dimensional sound localization process, a time difference of arrival process, a direction of arrival process, a triangulation process, or a steered response power method.

7. The method of claim 1, wherein displaying the visual indicator comprises displaying an out of view indicator of the object of interest in the live view if the location of the object of interest is not visible to the occupant in the live view, wherein the out of view indicator of the object of interest indicates that the object of interest is out of a field of view of the occupant.

8. The method of claim 1, wherein the object of interest is selected from a group consisting of an automobile, a fire truck, an ambulance, a police officer, a semi-trailer truck, and a train.

9. The method of claim 1, wherein the electronic display system is selected from at least one of a heads-up display, a mobile phone, a tablet computer, or smart glasses.

10. A vehicle information visualization system comprising: a computer system that receives sound data from a sound sensor system connected to a vehicle, wherein the sound data is for sounds detected in an exterior environment around the vehicle; analyzes the sound data for a presence of an object of interest; determines a location of the object of interest with respect to the vehicle using the sound data in response to detecting the presence of the object of interest; and displays a visual indicator for the object of interest whose presence was detected by the analyzing of the sound data with an indication of the location of the object of interest using an electronic display system in the vehicle to augment a live view of the exterior environment seen directly by an occupant through a window of the vehicle, wherein the display of the visual indicator for the object of interest whose presence was detected by the analyzing of the sound data with the location of the object of interest is overlaid on the live view to draw attention to the object of interest in the live view outside the vehicle such that both the sound data and the live view are used together with one another to provide situational awareness of the exterior environment to the occupant; wherein the computer system displaying, using the electronic display system in the vehicle to augment the live view of the exterior environment seen directly by the occupant through the window of the vehicle, a direction of travel of the object of interest whose presence was detected by the analyzing of the sound data responsive to detecting the object of interest whose presence was detected by the analyzing of the sound data, wherein the displaying of the visual indicator for the object of interest is overlaid on the object of interest in the live view to draw attention to the object of interest in the live view outside the vehicle; and displaying text from a voice to text conversion of the sound from the object of interest when the object of interest is a person in response to detecting the object of interest using the electronic display system in the vehicle to augment the live view of the exterior environment seen directly by the occupant through the window of the vehicle.

11. The method of claim 10, wherein in analyzing the sound data for the presence of the object of interest, the computer system compares the sound data to a plurality of sound signatures for a plurality of objects of interest and determines whether the sound data matches a sound signature for the object of interest in the plurality of sound signatures for the plurality of objects of interest.

12. The vehicle information visualization system of claim 10, wherein the computer system:
  determines whether multiple objects of interest are present using the sound data in response to receiving the sound data by the computer; and
  in response to determining that multiple objects of interest are present, (i) selects a particular one of the multiple objects of interest as being the object of interest for which the location thereof is determined per the determining the location step, and for which the visual indicator and the indication of the location thereof is displayed per the displaying step; and (ii) repeats the selects for all remaining of the multiple objects such that a respective visual indicator and respective indication of the location for each of a plurality of objects of interest are displayed using the electronic display system in the vehicle to augment the live view of the external environment seen directly by the occupant through the window of the vehicle.

13. The vehicle information visualization system of claim 10, wherein the computer system comprises a plurality of data processing systems, including a remote data processing system and the sound sensor system, that are in communication with each other using a communication medium, wherein the remote data processing system receives additional sound data from a set of vehicles having sound sensor systems, wherein in receiving the sound data from the sound sensor system connected to the vehicle, the remote data processing system of the computer system receives the sound data from the sound sensor system connected to the vehicle, and wherein in determining the location of the object of interest with respect to the vehicle using the sound data from the sound sensor system in response to detecting the presence of the object of interest, the remote data processing of the computer system determines the location of the object of interest with respect to the vehicle using the sound data from the sound sensor system and the additional sound data from the set of vehicles having the sound sensor systems in response to detecting the presence of the object of interest.

14. The vehicle information visualization system of claim 10, wherein the object of interest is selected from a group consisting of an automobile, a fire truck, an ambulance, a police officer, a semi-trailer truck, and a train.

15. The vehicle information visualization system of claim 10, wherein the electronic display system is selected from at least one of a heads-up display, a tablet computer, a mobile phone, or smart glasses.

16. A computer program product for an in-vehicle display of information for an object of interest, the computer program product comprising: a computer-readable storage media; first program code, stored on the computer-readable storage media, for receiving sound data from a sound sensor system connected to a vehicle, wherein the sound data is for sounds detected in an exterior environment around the vehicle; second program code, stored on the computer-readable storage media, for analyzing the sound data for a presence of an object of interest; third program code, stored on the computer-readable storage media, for determining a location of the object of interest with respect to the vehicle using the sound data in response to detecting the presence of the object of interest; fourth program code, stored on the computer-readable storage media, for displaying a visual indicator for the object of interest whose presence was detected by the analyzing of the sound data with an indication of the location of the object of interest using an electronic display system in the vehicle to augment a live view of the exterior environment seen directly by an occupant through a window of the vehicle, wherein the displaying of the visual indicator for the object of interest whose presence was detected by the analyzing of the sound data with the location of the object of interest is overlaid on the live view to draw attention to the object of interest in the live view outside the vehicle such that both the sound data and the live view are used together with one another to provide situational awareness of the exterior environment to the occupant; program code, stored on the computer-readable storage media, for displaying, using the electronic display system in the vehicle to augment the live view of the exterior environment seen directly by the occupant through the window of the vehicle, a direction of travel of the object of interest whose presence was detected by the analyzing of the sound data responsive to detecting the object of interest whose presence was detected by the analyzing of the sound data, wherein the displaying of the visual indicator for the object of interest is overlaid on the object of interest in the live view to draw attention to the object of interest in the live view outside the vehicle; and program code, stored on the computer-readable storage media, for displaying text from a voice to text conversion of the sound for the object of interest when the object of interest is a person using the electronic display system in the vehicle to augment the live view of the exterior environment seen directly by the occupant through the window of the vehicle in response to detecting the object of interest.

17. The computer program product of claim 16, wherein the computer system comprises a plurality of data processing systems, including a remote data processing system and the sound sensor system, that are in communication with each other using a communication medium, and further comprising:
  program code, stored on the computer-readable storage media, for receiving by the remote data processing system of the computer system additional sound data from a set of vehicles having sound sensor systems, wherein the first program code comprises:
  program code, stored on the computer-readable storage media, for receiving by the remote data processing system of the computer system the sound data from the sound sensor system, wherein the third program code comprises:
  program code, stored on the computer-readable storage media, for determining by the remote data processing system of the computer system the location of the object of interest with respect to the vehicle using the sound data from the sound sensor system and the additional sound data from the set of vehicles having the sound sensor systems in response to detecting the presence of the object of interest.

* * * * *